Nov. 3, 1964 D. P. SORENSEN 3,155,513
HEAT-SENSITIVE SHEET MATERIAL AND METHOD OF MAKING
Filed Oct. 30, 1961
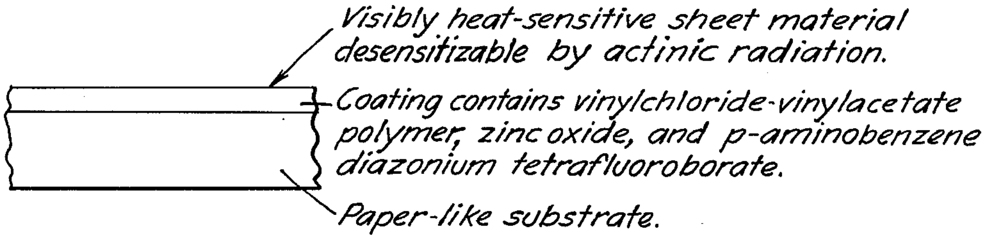
INVENTOR.
DAVID P. SORENSEN
BY
Carpenter, Abbott, Coulter & Kinney
ATTORNEYS 3,155,513
Patented Nov. 3, 1964

3,155,513

HEAT SENSITIVE SHEET MATERIAL AND METHOD OF MAKING

David P. Sorensen, St. Paul, Minn., assignor to Minnesota Mining and Manufacturing Company, St. Paul, Minn., a corporation of Delaware Filed Oct. 30, 1961, Ser. No. 148,755
8 Claims. (Cl. 96—91)

This invention relates to visibly heat-sensitive sheet materials, and in particular to sheet materials having a heat-sensitive layer including a film-forming vinyl halide polymer and a reactant catalyst progenitor such as zinc oxide.

Heat-sensitive sheet materials are known which include chlorine- or bromine-containing vinyl resin together with halogen-free metals or metal salts or oxides and which change visibly when strongly heated. In some instances the heat alone is sufficient to cause a change in appearance of the heated area; in others, irradiation with actinic light prior to heating is necessary or desirable in obtaining rapid color development. In both cases the heated, or irradiated and heated, areas are visibly altered. The sheets are stated to be useful for making recordings with a heated stylus or jet of heated air, or for printing with heated type, or for providing heat-developed copies of light-images.

The present invention similarly makes use of compositions including halogen-containing vinyl resins and metal oxides or the like in providing a visibly heat-sensitive recording sheet. However the products of the invention distinguish over previously known copy-sheets of similar composition by being rendered less, rather than more, sensitive to heat when previously exposed to actinic radiation. As a result, direct "black-on-white" copies of black-on-white originals may be made, e.g., by first irradiating the copy-sheet through the original and then heating the entire sheet. Another advantage is that, although direct localized heating of the non-irradiated sheet, e.g., with a hot stylus, produces a color change at the heated areas as with the previously known sheet materials, the resulting copy, unlike those prepared with the prior art products, does not darken in background areas during prolonged storage.

These unexpected results are obtained, in accordance with the present invention, by incorporating with the vinyl halide resin and metal oxide small proportions of photosensitive components, of which diazonium hexafluorophosphates and tetraborates are preferred examples, which under exposure to actinic radiation are known to liberate materials capable of acting as acceptors of free radicals.

The accompanying drawing represents a typical illustrating and preferred sheet material of the invention.

Typical sheet materials herein contemplated include paper, film or other paper-like fibrous or non-fibrous carrier or support member coated or impregnated with the light-and-heat-sensitive composition. Additional coatings may be applied for increased moisture resistance or abrasion resistance, as background color layers or contrast layers, or for other purposes, in which case either the coating or the carrier web must be transparent so that the sensitive layer remains visible. Since the sensitive composition includes a film-forming polymer as one component, no additional binders are required; but other binders, as well as various other additives such as pigments, dyes, fillers, plasticizers and infra-red-absorbing materials may be included where desired. The composition may be cast in thin film form on a temporary support, such as a treated paper or polished metal surface, from which the dried self-sustaining film may later be removed, forming an extremely thin copy-sheet.

Copolymers of vinyl chloride and a small proportion of vinyl acetate, for example in 87:13 ratio, are easily soluble in readily available and inexpensive volatile solvents, form smooth films, react well in systems here described, and are preferred; but other vinyl halide copolymers or homopolymers, as well as polymers of vinylidene chloride or bromide, halogenated polyethylene, and other halogen-containing vinylogous resins which may readily be dehydrohalogenated to a visibly different unsaturated polymer having at least 5 and preferably 10 or more conjugate double bonds, are also useful and are contemplated as coming within the ambit of the invention.

As the metallic component, zinc oxide provides a normally stable system which reacts readily under the desired conditions; it also serves as an economical white pigment of high hiding power, and is greatly preferred. Titanium dioxide is also useful. These materials are capable of combining with free chlorine radicals to produce Friedel-Crafts type metal chloride catalysts capable of catalyzing the dehydrohalogenation of vinyl chloride polymer resins. For economy in application, the zinc oxide is intimately mixed with the remaining components in an appropriate volatile vehicle, the mixture being diluted to spreadable consistency and applied in a single trip to the supporting web or surface by appropriate coating techniques, e.g., with a knife or bar spreader or on coating rolls. The oxide and the mixture of polymer and photosensitive material may alternatively be applied in separate thin layers if desired, in which event a small amount of the same or a different polymer is ordinarily included as a binder with the oxide, and the essentially transparent layer of photosensitive mixture is placed in contact with the side of the oxide layer from which the image is to be viewed.

When applied as a separate coating, the zinc oxide may be present in any desired amount. When intermixed with the other components, the proportion of zinc oxide will be so selected as to provide effective reactivity while avoiding such opacity as would mask the visibility of the image. In general, where zinc oxide is used in conjunction with a vinyl chloride polymer in a single coating, weight proportions of approximately one part of oxide to five parts of polymer have proven effective, although these proportions may be widely varied.

Very much smaller amounts of photosensitive material are needed, amounts of about 1–2% by weight based on the vinyl polymer being fully effective although larger amounts are not harmful.

In the following illustrative examples, proportions are given in parts by weight unless otherwise indicated.

*Example 1*

Zinc oxide, twenty parts, is mixed into a solution of 100 parts of "Vinylite VYHH" resin (a copolymer of 87 parts vinyl chloride and 13 parts vinyl acetate), in solution in volatile organic solvent, by prolonged ball milling. p-Aminobenzene diazonium tetrafluoroborate, 1.5 parts, is added and the resulting mixture promptly spread in a thin uniform layer on map overlay tracing paper and dried at room temperature in dim light. The resulting copy-paper is light gray in appearance and becomes dark brown on brief contact with a metal test bar or stylus at 180° C. After exposure for 30 seconds to ultraviolet irradiation from an AH–4 lamp at a distance of 2–4 inches, the sheet is no longer darkened by such heating.

A sheet of the copy-paper is exposed to ultra-violet through a positive transparency having opaque printed characters on a transparent film, and is then heated at 180° C. in an oven. A direct copy of the printed original is produced, in the form of brownish black letters on a white background.

*Example 2*

Zinc oxide dispersed in a small amount of the vinyl polymer of Example 1 is smoothly coated on a paper carrier and the coating is dried. A further thin coating of 100 parts of the vinyl polymer and 1.5 parts of the diazonium tetrafluoroborate of Example 1 is applied over the zinc oxide coating and dried. The resulting white copy-sheet becomes black when placed in brief contact with the metal test bar or stylus at 195° C. After four trips beneath the ultraviolet source in a Bruning "Copy-flex" copying machine at speed 2 the white background areas of the sheet no longer darken in the test procedure at 195° C. The actinic radiation supplied is approximately twice the amount provided under the conditions described in Example 1.

*Example 3*

The results obtained in Example 2 are duplicated in a sheet in which p-anilinobenzene diazonium hexafluorophosphate in equal amount replaces the diazonium tetrafluoroborate.

*Example 4*

Increasing the amount of diazonium hexafluorophosphate in Example 3 to two parts makes possible the stabilization of the sheet with one-half the ultraviolet exposure there required.

*Example 5*

A photodesensitizable white copy-sheet producing a brown image in unlighted areas at a test bar temperature of 170° C. is produced by replacing the fluoroborate stabilizer of Example 1 with an equal weight of p-acetylaminobenzenediazonium tetrafluoroborate.

*Example 6*

The heat-sensitive coating contains 100 parts "Vinylite VYHH" resin, 20 parts zinc oxide, and 1.5 parts N-nitrosodiphenylamine. The sheet darkens rapidly at 220° C. After 30 seonds exposure to ultraviolet radiation under a BH–6 lamp, the time at 220° C. required to cause darkening of the sheet is greatly increased. Exposure of the sheet to ultraviolet through a stencil followed by heating between heated metal plates or in an oven causes selective darkening of the protected areas.

*Example 7*

The heat-sensitive coating contains, in addition to 100 parts of Vinylite VYHH resin and 20 parts of zinc oxide, 1.5 parts of 3-diethylamino-4-methylbenzene diazonium tetrafluoroborate and 1.0 part of N-nitrosodiphenylamine. Darkening occurs on contact with a metal stylus or plate at 160° C. Desensitization is obtained in 30 seconds under the AH–4 ultraviolet lamp.

Other photosensitive stabilizers which have been found useful in the practice of the invention include:

p-Chlorobenzenediazonium hexafluorophosphate;
p-Acetylaminobenzenediazonium hexafluorophosphate;
p-Chlorobenzenediazonium fluoroborate; and
Dimethyldihydroresorcinol.

Photosensitive N-nitroso aromatic amines are known to liberate free radical acceptors when exposed to actinic radiation. The same is true of the photosensitive aromatic diazonium fluorophosphates and fluoroborates. The latter materials additionally liberate compounds such as $BF_3$ and $PF_5$ which are known to be active catalysts for the polymerization or crosslinking of olefinically unsaturated monomers or polymers. As a probable explanation of the phenomena hereinbefore described, it is therefore suggested that exposure of the heat-sensitive sheet material to actinic radiation results in the liberation of a free radical acceptor, and, in the preferred embodiments, in the liberation also of a catalyst for vinyl or ethylenic polymerization. Under the influence of localized heat, halogen is removed from the dehydrohalogenatable polymeric binder of the sensitive sheet in the form of free radicals, which normally form with the metallic oxide a Friedel-Crafts type metal halide catalyst, the catalyst then causing dehydrohalogenation of the polymer and formation of multiple ethylenic double bonds, resulting in a visible darkening. In areas containing the free radical acceptor, the halogen radicals are prevented from reacting with the metal oxide, and dehydrohalogenation of the polymer does not occur. In the case of the stabilizer materials which liberate both free radical acceptors and catalysts for ethylenic crosslinking, any double bond formation which may occur is neutralized by subsequent cross-linking induced by said catalyst. Thus the over-all effect of exposure to actinic radiation is to diminish or prevent, rather than accelerate, the heat development of color in the heat-sensitive sheet material.

In partial support of the foregoing explanation, it has been noted that the addition of small proportions of hydroquinone to the zinc oxide-vinyl chloride resin mixture produces a coating which remains visibly unchanged on brief heating; whereas after removal of the hydroquinone by sublimation, the sheet darkens rapidly at 200° C. Small amounts of diphenyl-picrylhydrazyl similarly prevent darkening of the zinc oxide-vinyl resin film. Both of these compounds are known to be effective free radical acceptors.

But regardless of the specific mechanism involved, the invention provides a novel photodesensitizable visibly heat-sensitive sheet material which, although based on poly-vinyl chloride and zinc oxide or equivalent interreactants, is diminished rather than increased in heat-reactivity on being exposed to actinic radiation, and which is capable of producing stable non-darkening copies of graphc originals.

What I claim is as follows:

1. A heat-sensitive copy-sheet including a visibly heat-sensitive layer comprising a vinyl chloride polymer which is dehydrohalogenatable to a visibly different unsaturated polymer having at least five conjugate double bonds, zinc oxide, and a diazonium fluoroborate photo-sensitive free radical acceptor progenitor stabilizer material.

2. A heat-sensitive copy-sheet including a visibly heat-sensitive layer comprising a vinyl chloride polymer which is dehydrohalogenatable to a visibly different unsaturated polymer having at least five conjugate double bonds, zinc oxide, and a diazonium fluorophosphate photo-sensitive free radical acceptor progenitor stabilizer material.

3. A heat-sensitive copy-sheet including a visibly heat-sensitive layer comprising a vinyl chloride polymer which is dehydrohalogenatable to a visibly different unsaturated polymer having at least five conjugate double bonds, zinc oxide, and an N-nitroso aromatic amine photo-sensitive free radical acceptor progenitor stabilizer material.

4. A heat-sensitive copy-sheet including a visibly heat-sensitive layer comprising a vinyl chloride polymer which is dehydrohalogenatable to a visibly different unsaturated polymer having at least five conjugate double bonds, zinc oxide, and dimethyldihydroresorcinol.

5. A heat-sensitive copy-sheet comprising a thin flexible support web and a visibly heat-sensitive coating thereon comprising a vinyl chloride polymer which is dehydrohalogenatable to a visibly different unsaturated polymer having at least five conjugate double bonds, zinc oxide, and a photosensitive free radical acceptor progenitor stabilizer material.

6. The method of making a photodesensitizable visibly heat-sensitive sheet material having a visibly heat-sensitive layer of components including a halogen-containing vinylogous polymer capable of being readily dehydrohalogenated with formation of at least five conjugate double bonds on heating in the presence of catalytic amounts of a Friedel-Crafts type metal chloride catalyst, and zinc oxide, said method comprising incorporating with said layer a significant small amount of at least about one percent by weight on the weight of said polymer of a photo-sensitive stabilizer material selected from the class consisting of aromatic diazonium fluorophosphates, aromatic diazonium fluoroborates, N-nitroso aromatic amines, dimethyldihydroresorcinol, and mixtures thereof.

7. The method of making a photodesensitizable visibly heat-sensitive sheet material having a visibly heat-sensitive layer of components including a vinyl chloride polymer which is dehydrohalogenatable to a visibly different unsaturated polymer having at least five conjugate double bonds and zinc oxide, said method comprising incorporating with said layer a significant small amount, of at least about one percent by weight of the weight of said polymer, of a photosensitive stabilizer material selected from the class consisting of aromatic diazonium fluorophosphates, aromatic diazonium fluoroborates, N-nitroso aromatic amines, dimethyldihydroresorcinol, and mixtures thereof.

8. A heat-sensitive sheet material capable of being visibly changed by brief contact with a metal test bar at 180° C. and of being rendered stable against such heating by exposure to ultraviolet irradiation, said sheet comprising a sensitive layer consisting essentially of a halogen-containing vinylogous polymer capable of being readily dehydrohalogenated with formation of a visibly distinct modification containing multiple conjugate ethylenic bonds on heating in the presence of catalytic amounts of a Friedel-Crafts type metal chloride catalyst, zinc oxide, and a significant small amount, at least about one percent on the weight of said polymer, of a photosensitive stabilizer material selected from the class consisting of aromatic diazonium fluorophosphates, aromatic diazonium fluoroborates, N-nitroso aromatic amines, dimethyldihydroresorcinol, and mixtures thereof.

References Cited in the file of this patent

UNITED STATES PATENTS

| | | |
|---|---|---|
| 2,680,062 | Sus | June 1, 1954 |
| 2,712,996 | Elliott | July 12, 1955 |
| 2,772,158 | Elliott | Nov. 27, 1956 |
| 2,772,159 | Elliott | Nov. 27, 1956 |
| 2,789,052 | Elliott | Apr. 16, 1957 |
| 2,789,053 | Elliott | Apr. 16, 1957 |
| 2,855,266 | James | Oct. 7, 1958 |
| 3,042,517 | Wainer | July 3, 1962 |

OTHER REFERENCES

Lange and Muller: Ber., 1930, 63, pages 1067–1068.